US006981016B1

(12) United States Patent
Ryan

(10) Patent No.: US 6,981,016 B1
(45) Date of Patent: Dec. 27, 2005

(54) DISTRIBUTED CLIENT/SERVER COMPUTER NETWORK

(75) Inventor: Andrew Edward Ryan, Brighton (GB)

(73) Assignee: Visage Development Limited, Surrey (GB)

( * ) Notice: Subject to any disclaimer, the term of this patent is extended or adjusted under 35 U.S.C. 154(b) by 0 days.

(21) Appl. No.: 09/330,975

(22) Filed: Jun. 11, 1999

(51) Int. Cl.[7] .............................................. G06F 13/00
(52) U.S. Cl. ...................... 709/203; 713/184; 713/186
(58) Field of Search ....................... 385/115; 707/102, 707/10; 713/202, 185, 184, 186, 200, 212; 709/203; 340/5.27, 5.8; 382/115, 118, 232; 705/1; 380/285, 283; 455/412.1

(56) References Cited

U.S. PATENT DOCUMENTS

| | | | | |
|---|---|---|---|---|
| 5,280,527 A | * | 1/1994 | Gullman et al. ............. 713/184 |
| 5,608,387 A | * | 3/1997 | Davies ....................... 340/5.27 |
| 5,754,675 A | * | 5/1998 | Valadier ..................... 382/115 |
| 5,818,955 A | * | 10/1998 | Smithies et al. ............ 382/115 |
| 5,928,364 A | * | 7/1999 | Yamamoto .................. 713/202 |
| 6,016,476 A | * | 1/2000 | Maes et al. ..................... 705/1 |
| 6,018,739 A | * | 1/2000 | McCoy et al. .............. 707/102 |
| 6,044,349 A | * | 3/2000 | Tolopka et al. ................. 705/1 |
| 6,157,943 A | * | 12/2000 | Meyer ........................ 709/203 |
| 6,167,517 A | * | 12/2000 | Gilchrist et al. ............. 713/186 |
| 6,182,076 B1 | * | 1/2001 | Yu et al. ........................ 707/10 |
| 6,182,221 B1 | * | 1/2001 | Hsu et al. .................... 713/186 |
| 6,209,104 B1 | * | 3/2001 | Jalili ........................... 713/202 |
| 6,216,230 B1 | * | 4/2001 | Rallis et al. ................. 713/185 |
| 6,219,439 B1 | * | 4/2001 | Burger ........................ 382/115 |
| 6,317,544 B1 | * | 11/2001 | Diehl et al. ................. 385/115 |
| 6,345,110 B1 | * | 2/2002 | Niyogi et al. ............... 382/118 |
| 6,487,662 B1 | * | 11/2002 | Kharon et al. .............. 713/186 |
| 6,507,912 B1 | * | 1/2003 | Matyas, Jr. et al. ......... 713/200 |
| 6,650,889 B1 | * | 11/2003 | Evans et al. ............. 455/412.1 |
| 6,690,830 B1 | * | 2/2004 | Cote ........................... 382/232 |

FOREIGN PATENT DOCUMENTS

WO          WO93/11511        6/1993

* cited by examiner

*Primary Examiner*—John Follansbee
*Assistant Examiner*—Jungwon Chang
(74) *Attorney, Agent, or Firm*—Gordon & Jacobson, P.C.

(57) ABSTRACT

A distributed client/server computer network wherein the identity of at least one complex image, selected from a plurality of complex images stored by a client, is transmitted to a remote server. The remote server then determines, from the identity of the or each image selected, whether the client is authorised to gain access, via the server, to a particular network resource. The network is thus efficient, as the complex images themselves do not need to be transmitted from the client to the server, and secure, as no authorization information is stored by the client.

30 Claims, 2 Drawing Sheets

DISTRIBUTED CLIENT/SERVER COMPUTER NETWORK

FIELD OF THE INVENTION

The present invention relates to a distributed client/server computer network, and more particularly to a distributed client/server computer network which provides a client with controlled access, via a remote server, to a particular network resource such as an Internet web-site or service.

BACKGROUND OF THE INVENTION

A large number of distributed client/server computer networks are known wherein an appropriate authorisation code must be transmitted from a client to a remote server for the client to gain access, via the server, to a particular network resource.

The vast majority of authorisation codes comprise a series of alphanumeric characters, a "password", which is entered by a user via a keyboard interface.

However, a password is inherently difficult to remember, particularly if it used seldomly over a prolonged period of time, and is easily conveyed either verbally or visually to an unscrupulous third party who might use the password to gain unauthorised access to a network resource.

Our European patent No. 0614559 discloses a personal identification device for providing controlled access to a computer system. The device comprises a store of identification codes and associated authorisation codes, access to the computer system being provided where an identification code/authorisation code combination, submitted by a user, matches a combination stored previously in a memory of the device.

The device of European patent No. 0614559 overcomes the problems associated with the use of alphanumeric passwords by using, for each authorisation code, a respective series of complex images selected from a plurality of similar complex images. Such complex images may take a number of different forms, e.g. visual images, auditory images, etc., however digitised images of human faces have been found to be particularly suitable due to the innate ability of humans to readily distinguish between faces which differ in appearance from one another in very subtle respects, but also due to the fact that such subtle differences in appearance are very difficult to convey verbally or otherwise from person to person.

An object of the present invention is therefore to incorporate, in a particularly efficient and secure manner, a personal identification system of the type disclosed in European patent No. 0614559 into a distributed client/server computer network, to thereby provide a client with controlled access, via a remote server, to a particular network resource.

SUMMARY OF THE INVENTION

In accordance with the present invention, there is provided a distributed client/server computer network wherein the identity of at least one complex image, selected from a plurality of complex images stored by a client, is transmitted to a remote server which determines, from the identity of the or each image selected, whether the client is authorised to gain access, via the server, to a particular network resource.

The authorisation procedure provided by such a network is clearly very efficient in that once the client has been provided with a store of complex images, subsequent access to the network resource requires only the identity of the or each selected image, rather than the image itself, to be communicated between the client and the server. Thus, the significant time delays associated with the transmission of complex images are avoided.

Furthermore, the network is highly secure as no information is stored by the client which might be used to determine the image or images which must be selected to provide the client with access to the network resource.

Preferably the plurality of images comprises at least one key image and at least one dummy image, access to the network resource being gained by the client by selecting the or each key image in preference to the or each dummy image. However, the order in which two or more images are selected may also or otherwise be used to determine whether the client is authorised to gain access to the network resource.

Most preferably, the plurality of images are presented in successive, mutually-exclusive subsets, each subset containing a plurality of dummy images and a key image which must be selected in preference to the dummy images in its respective subset.

Preferably the plurality of images are down-loaded from the server to the client.

The image or images which must be selected may be chosen from a plurality of images stored by the server or may be chosen from the plurality of images stored by the client.

In the former case, the or each chosen image is preferably a key image which is down-loaded from the server to the client together with a plurality of dummy images. The dummy images may comprise the remainder of the plurality of images from which the or each key image is chosen, a subset thereof or an alternative set of images to those from which the key image or images are chosen, but which images bear a resemblance to the key image or images.

In the latter case, it will be appreciated that the identity of the or each chosen image must be transmitted from the client to the server.

In either case, where two or more images are chosen, the order in which those images are chosen may determine the order in which the images must subsequently be selected.

Also in accordance with the present invention, there is provided a method for providing a client of a distributed client/server computer network with controlled access, via a remote server, to a particular network resource, said method comprising the steps of providing the client with a store of complex images, selecting at least one image from the stored images and transmitting the identity of the or each selected image to the server which determines, from the identity of the or each image selected, whether the client is authorised to gain access, via the server, to the network resource.

Preferably the step of providing the client with a store of complex images comprises down-loading the images from the server to the client.

BRIEF DESCRIPTION OF THE DRAWINGS

An embodiment of the present invention will now be described by way of an example only and with reference to the accompanying drawings, in which.

DESCRIPTION OF THE PREFERRED EMBODIMENT

Figure 1:
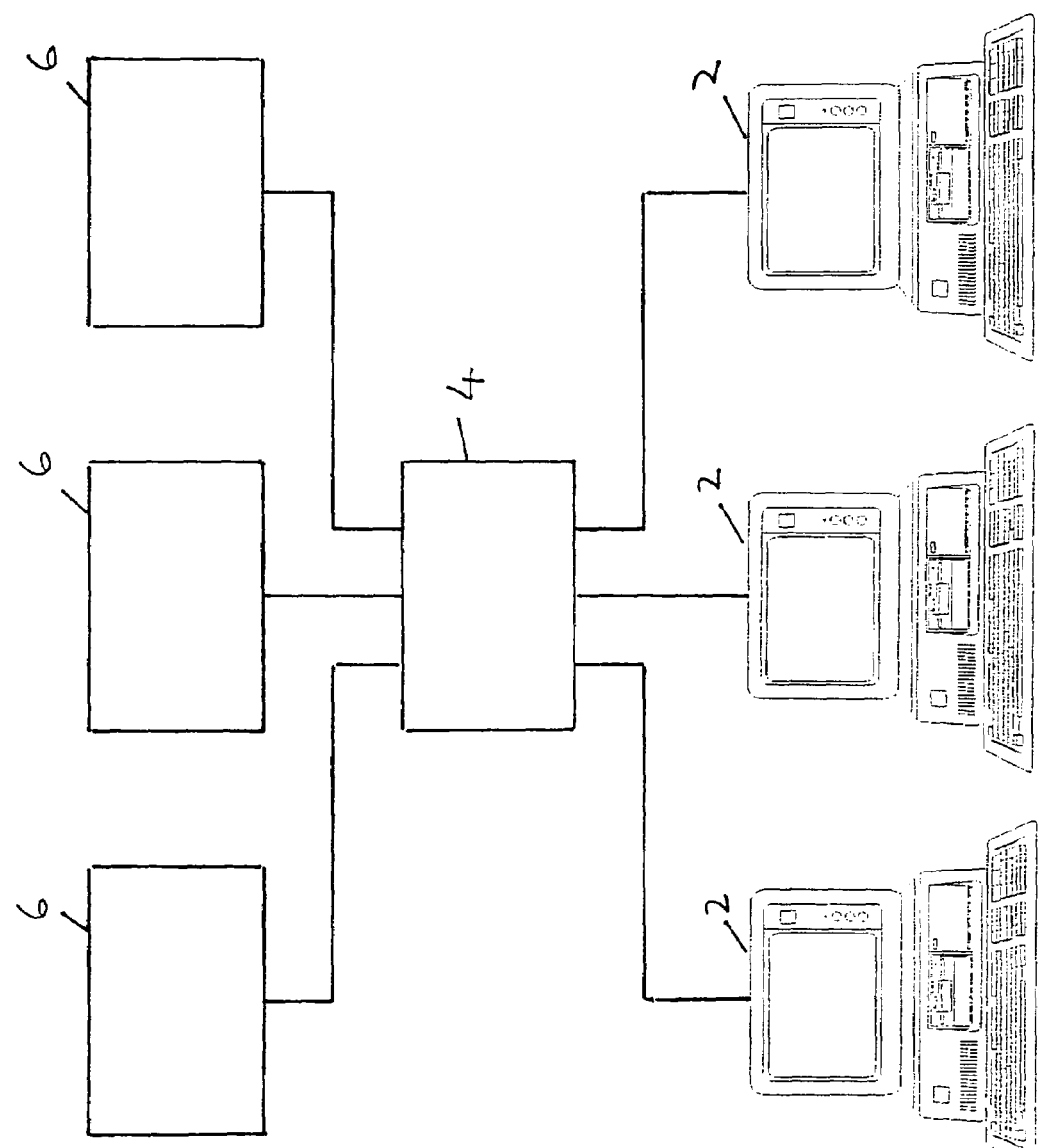
FIG. 1 is a schematic view of a distributed client/server computer network in accordance with the present invention.

Referring to FIG. 1 of the drawings, a distributed client/server computer network is shown comprising a plurality of local computer systems 2, each of which communicates over a respective telephone line or other telecommunications link with a remote computer system 4, hereinafter referred to as a server, which is arranged to provide each of the local computer systems 2 with controlled access to one or more network resources 6, such as Internet sites and services.

In the present context, any of the local computers 2, when in communication with the server, is termed a client.

Also, whilst a network is shown comprising a plurality of independent local computer systems 2, a single server 4 and a plurality of resources 6 which are remote from the server 4, the local computer systems may instead be integrated into a local area network, the server may be that of an Internet access provider, itself in communication with a plurality of other servers, or a server with which that of the Internet access provider communicates, and one or more of the resources may be provided locally by the server.

In the embodiment illustrated, where a client 2 is to be provided with controlled access to a particular network resource 6, the client 2 must first transmit to the server 4 a chosen alphanumeric identification code and corresponding authorisation code, a record of the two codes being stored by the server 4 for subsequent verification of the client 2.

The authorisation code comprises a coded reference to a sequence of four key images chosen from a display of thirty six complex images down-loaded to the client 2 from the server 4.

Once an identification code and a corresponding authorisation code have been chosen, the client 2 may subsequently gain access to ("logon" to) the network resource 6 by re-transmitting the same combination of codes to the server 4.

Figure 2:
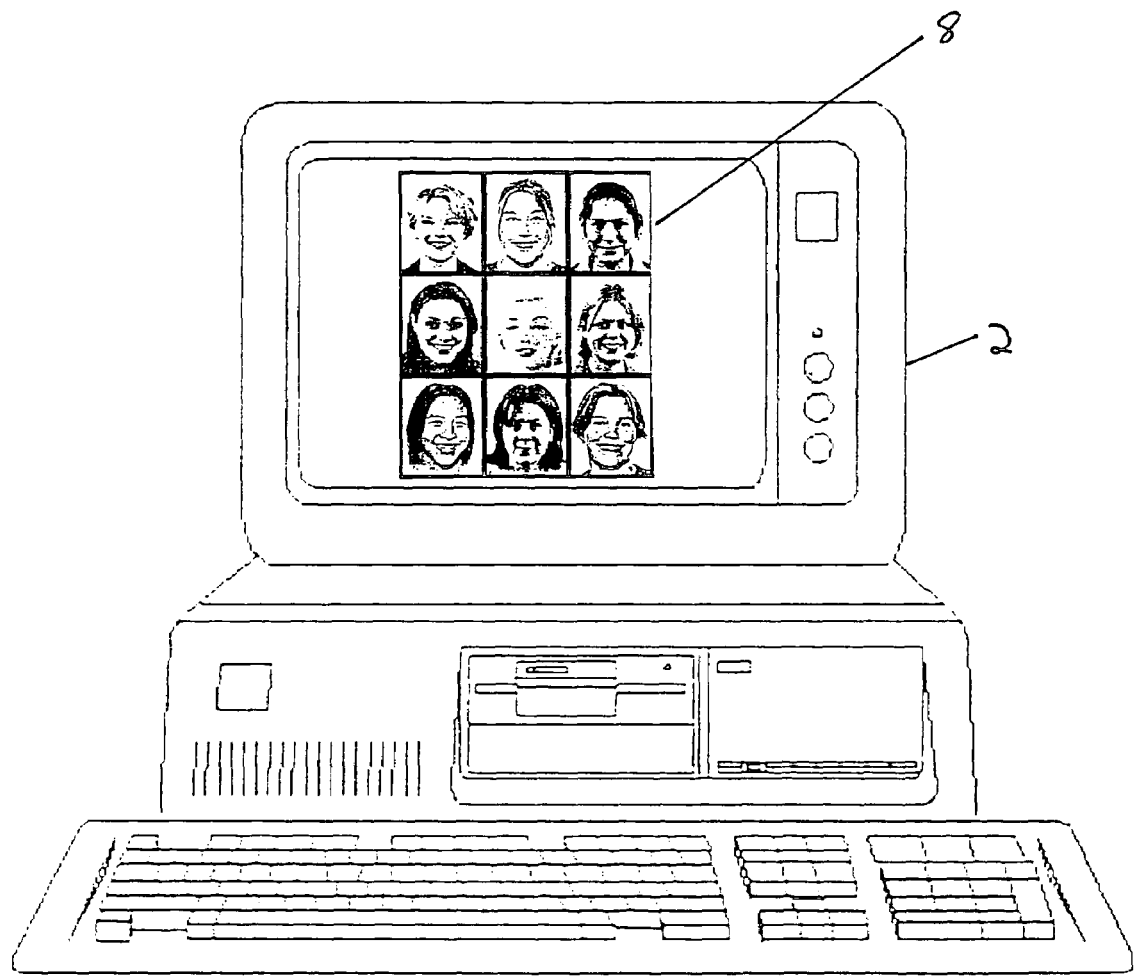
FIG. 2 is drawing of a computer having a screen display from which complex images may be selected.

FIG. 2 shows one of a sequence of four displays in which a respective one of the four key images is displayed together with eight dummy images arranged in a 3×3 matrix 8. Each key image must be selected over the dummy images in its respective display for the client to be provided with access to the resource.

The network thus described is clearly very efficient in that, once the client 2 has been provided with a store of complex images, subsequent access to a network resource 6 requires only the identity of a selected image, rather than the image itself, to be communicated between the client 2 and the server 4. Thus, the significant time delays associated with the transmission of complex images are avoided.

Furthermore, the network is highly secure as no information is stored by the client 2 which might be used to determine the image or images which must be selected to provide the client 2 with access to the network resource 6.

What is claimed is:

1. A distributed client/server computer network, said network comprising:
   a client and a remote server;
   non-volatile means in said client for storing a plurality of complex images, each of said complex images having an alphanumeric identification code;
   means for displaying at least two of said complex images;
   means for selecting at least one complex image from said images displayed;
   means for transmitting the alphanumeric identification code of said selected complex image or images from client to said remote server; and
   means for determining by said remote server, from the alphanumeric identification code of each image selected, whether the client is authorised to gain access, via the remote server, to a network resource.

2. A distributed client/server computer network as claimed in claim 1, wherein the plurality of images comprises at least one key image and at least one dummy image, access to the network resource being gained by the client by selecting each key image in preference to each dummy image.

3. A distributed client/server computer network as claimed in claim 1, wherein order in which two or more images are selected is used to determine whether the client is authorised to gain access to the network resource.

4. A distributed client server computer network as claimed in claim 1, wherein the plurality of images are presented in successive, mutually-exclusive subsets, each subset containing a plurality of dummy images and a key image which must be selected in preference to the dummy images in its respective subset.

5. A distributed client/server computer network as claimed in claim 1, wherein the plurality of images are down-loaded from the server to the client.

6. A distributed client/server computer network as claimed in claim 5, wherein the image or images which must be selected are chosen from a plurality of images stored by the server.

7. A distributed client/server computer system as claimed in claim 6, wherein each chosen image is a key image which is down-loaded from the server to the client together with a plurality of dummy images.

8. A distributed client/server computer system as claimed in claim 7, wherein the dummy images comprise the remainder of the plurality of images from which each key image is chosen.

9. A distributed client server computer system as claimed in claim 6, wherein order in which two or more images are chosen determines the order in which the images must subsequently be selected.

10. A distributed client/server computer system as claimed in claim 7, wherein the dummy images comprise a subset of the remainder of the plurality of images from which each key image is chosen.

11. A distributed client/server computer system as claimed in claim 7, wherein the dummy images comprise an alternative set of images to those from which the key image or images are chosen, but which images bear a resemblance to the key image or images.

12. A distributed client/server computer network as claimed in claim 1, wherein the image or images which must be selected are chosen from the plurality of images stored by the client.

13. A distributed client server computer system as claimed in claim 12, wherein order in which two or more images are chosen determines the order in which the images must subsequently be selected.

14. A method for providing a client of a distributed client/server computer network with controlled access, via a remote server, to a network resource, said method comprising the steps of:
   providing the client with a non-volatile store of complex images, each of said complex images having an alphanumeric identification code;
   displaying at the client at least two of said complex images;
   selecting at least one image from the images displayed;

transmitting the alphanumeric identification code of each selected image from said client to said remote server; and determining, in said remote server, from the alphanumeric identification code of each image selected, whether the client is authorised to gain access, via the server, to the network resource.

15. A method as claimed in claim 14, wherein the step of providing the client with a store of complex images comprises down-loading the images from the server to the client.

16. A distributed client/server computer network, said network comprising: a client and a remote server; non-volatile storage means in said client, to store a plurality of predetermined visual images, each of said visual images having an associated respective alphanumeric identification code; means for said client to select at least one visual image from said plurality of visual images stored by said client; means for said client to transmit the respective alphanumeric identification code of each of said at least one selected visual image from said client to said remote server; and means for said remote server to recognise the respective alphanumeric identification code of each of said at least one selected visual image to allow the client to gain access to a network resource.

17. A distributed client/server computer network as claimed in claim 16, wherein the plurality of predetermined visual images comprises at least one key visual image and at least one dummy visual image, access to the network resource being gained by the client by selecting the at least one key visual image in preference to the at least one dummy image.

18. A distributed client/server computer network as claimed in claim 16, wherein said at least one selected visual image comprises a plurality of selected visual images, and wherein said remote server comprises means to recognise the order in which the respective alphanumeric identification codes are received to allow the client to gain access to the network resource.

19. A distributed client server computer network as claimed in claim 16, wherein said at least one selected visual image comprises a plurality of selected visual images; wherein said client comprises means to present said plurality of predetermined visual images in a plurality of successive, mutually-exclusive subsets for selection of a visual image from each subset; wherein each subset contains a plurality of dummy images and a key image; and wherein said remote server comprises means to allow the client to access the network resource in response to receipt of the respective alphanumeric identification code for the respective key image in each of said plurality of subsets of predetermined visual images.

20. A distributed client/server computer network as claimed in claim 16, wherein said remote server comprises a store for said plurality of predetermined visual images, and wherein said remote server and said client each comprises co-operative means to down-load, on an initial occasion, the plurality of predetermined visual images from the store in said server to the non-volatile storage means in said client.

21. A distributed client/server computer network as claimed in claim 20, wherein the at least one visual image which to be selected by the client is chosen from among a plurality of predetermined visual images previously stored in the remote server.

22. A distributed client/server computer system as claimed in claim 21, wherein the at least one selected image is a predetermined key visual image, said key visual image having been down-loaded from the remote server to the client together with a plurality of dummy visual images.

23. A distributed client/server computer system as claimed in claim 22, wherein the plurality of dummy visual images comprises the remainder of the plurality of visual images, the plurality of visual images including the at least one key visual image.

24. A distributed client server computer system as claimed in claim 21, wherein said at least one selected visual image comprises a plurality of selected visual images; and wherein said remote server comprises means to recognise the order in which the plurality of respective alphanumeric identification codes are received to allow the client to gain access to the network resource.

25. A distributed client/server computer system as claimed in claim 22, wherein the plurality of dummy visual images comprise a subset of the remainder of the plurality of visual images, the plurality of visual images including the at least one key visual image.

26. A distributed client/server computer system as claimed in claim 22, wherein the plurality of dummy visual images comprises a set of alternative visual images, each of said alternative visual images bearing a resemblance to the at least one key image.

27. A distributed client/server computer network as claimed in claim 16, wherein the at least one visual image to be selected by the client is selected from the plurality of predetermined visual images stored by the client in the non-volatile storage means.

28. A distributed client server computer system as claimed in claim 27, wherein said at least one selected visual image comprises a plurality of selected visual images; wherein said remote server comprises means to recognise the order in which the plurality of respective alphanumeric identification codes are received to allow the client to gain access to the network resource; and wherein said remote server comprises means to note the order of receipt of the plurality of respective alphanumeric identification codes and to use the noted order of receipt of the plurality of respective alphanumeric identification codes on each occasion to determine the required order of receipt of the plurality of respective alphanumeric identification codes on the next subsequent occasion for said remote server to allow the client to gain access to the network resource.

29. A method for providing a client of a distributed client/server computer network with controlled access, via a remote server, to a network resource, said method comprising the steps of: providing the client with a non-volatile store of a plurality of pre-determined visual images, each of said plurality of visual images having an associated respective alphanumeric identification code; the client selecting at least one visual image from the stored visual images; the client transmitting the respective alphanumeric identification code of each of said at least one selected visual image from said client to said remote server; and said remote server recognising the respective alphanumeric identification code of each of said at least one selected visual image to allow the client is to gain access to the network resource.

30. A method as claimed in claim 29, wherein the step of providing the client with a non-volatile store of a plurality of predetermined visual images comprises the step of down-loading the plurality of predetermined visual images, on an initial occasion, from the remote server to the client.

* * * * *